Oct. 30, 1962
L. D. MORRIS ET AL
3,060,663
DUST COLLECTOR
Filed Jan. 21, 1960
4 Sheets-Sheet 1
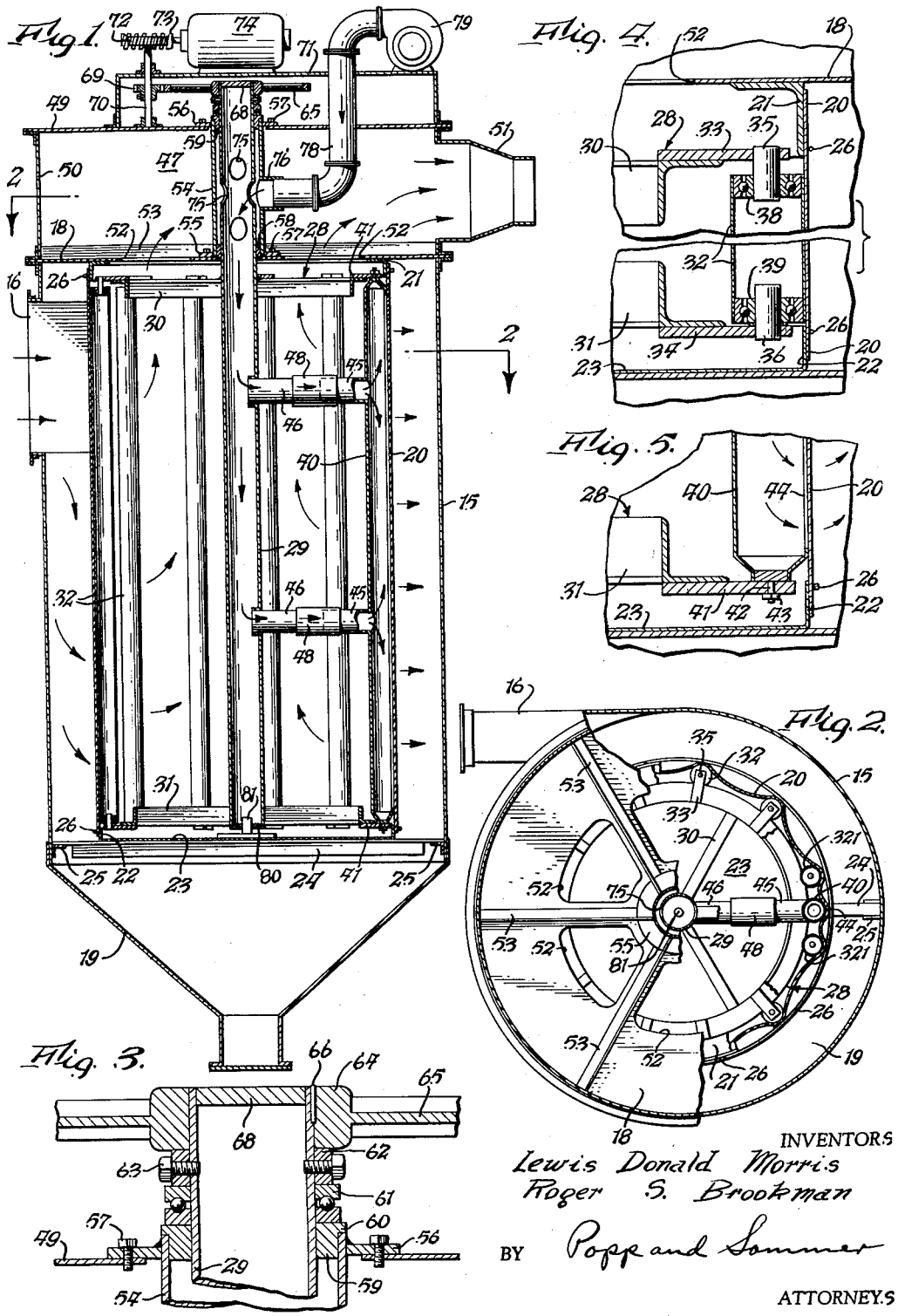
INVENTORS
Lewis Donald Morris
Roger S. Brookman
BY Popp and Sommer
ATTORNEYS INVENTORS.
Lewis Donald Morris
Roger S. Brookman BY Popp and Sommer

ATTORNEYS.

INVENTORS
Lewis Donald Morris
Roger S. Brookman

BY Popp and Sommer

ATTORNEYS

United States Patent Office 3,060,663
Patented Oct. 30, 1962

3,060,663
DUST COLLECTOR
Lewis D. Morris, Williamsville, and Roger S. Brookman, East Aurora, N.Y., assignors to Dustex Corp., Buffalo, N.Y., a corporation of New York
Filed Jan. 21, 1960, Ser. No. 3,848
8 Claims. (Cl. 55—302)

This invention relates to improvements in dust collectors, and more particularly to those of the type employing an endless foraminous filter element such as cloth.

It is an object of the present invention to clean the filter element effectively and continuously in order to maintain the operation efficiency of the dust collector.

Another object is to support the flexible filter element in such a manner that any dimensional changes therein do not interfere with the effective and continuous cleaning of the filter element.

Another object is to solve sealing problems at the ends of the tubular filter element by eliminating the prior practice of providing a sliding seal joint between the end of the filter element and the support member therefor.

A further object is to provide a dust collector of the type in question which is compact, relatively simple, practical, relatively inexpensive, not likely to get out of order or require repairs and designed so that the filter element can be easily installed and removed for replacement if necessary.

Other objects and advantages of the present invention will be apparent from the following detailed description and accompanying drawings in which:

FIG. 1 is a vertical central sectional view through the preferred embodiment of the present invention and which may be characterized by having a stationary filter element supported on a rotating reel.

FIG. 2 is a transverse sectional view thereof taken generally on the line 2—2 of FIG. 1 and showing certain parts broken away to reveal otherwise hidden structure.

FIG. 3 is an enlarged fragmentary vertical central sectional view of part of the drive mechanism at the upper end of the tubular support for the rotatable reel shown in FIG. 1.

FIG. 4 is an enlarged fragmentary central sectional view through opposite ends of one roller which forms an element of the rotatable reel supporting the filter element.

FIG. 5 is an enlarged fragmentary vertical central sectional view through the lower end of the blow tube shown in FIG. 1.

FIGS. 1 THROUGH 5

Figure 6:
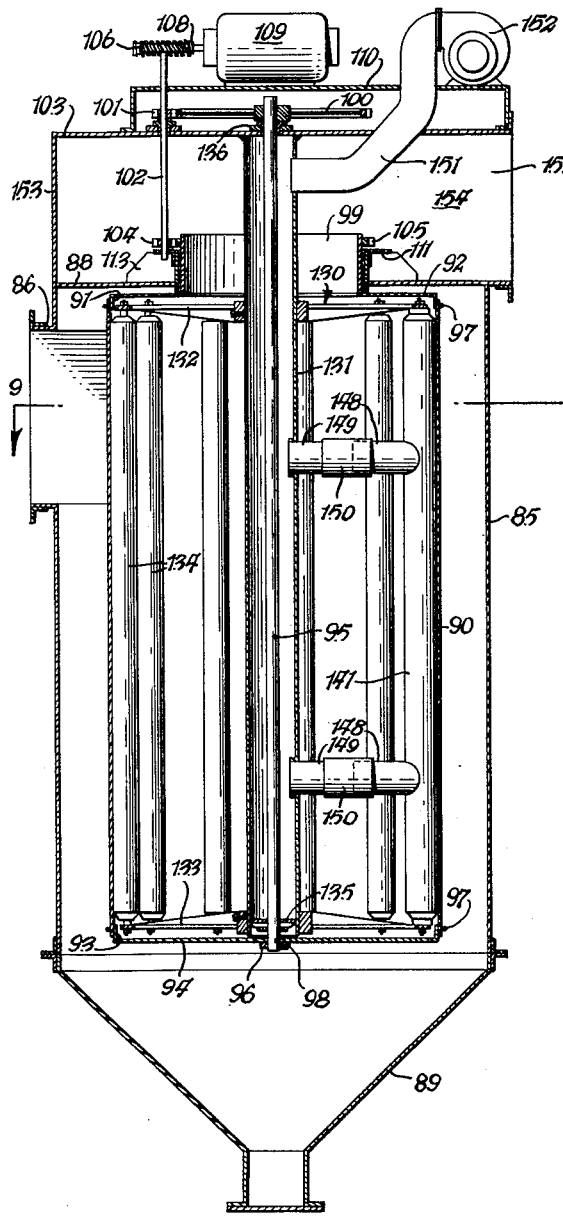
FIG. 6 is a vertical central sectional view through a modified form of the invention and which may be characterized by having a filter element moving about a stationary reel.

The preferred form of the invention illustrated in FIGS. 1 through 5 is shown as comprising a cylindrical casing 15 arranged with its axis extending vertically, a tangential inlet duct 16 adjacent its upper end, a top wall 18 at its upper end and a hopper 19 at its lower end.

Arranged within the chamber or interior of the casing 15 is a flexible endless filter element 20 in the form of a tube open at its opposite ends. The filter element may be made of any suitable material and a woven fabric or cloth is frequently used. The upper end of the filter element 20 is shown as embracing or overlapping the depending annular flange of an end ring 21. The lower end of the filter element 20 is shown as embracingly surrounding the upstanding annular flange 22 of an end ring having a closed end wall indicated at 23. The upper end ring 21 is suitably secured to the underside of the horizontal top wall 18. The lower end ring 23 is supported in any suitable manner adjacent the top of the hopper 19. As shown, this lower end ring 23 is suitably secured to a transverse bar 24 which is supported at opposite ends on lugs 25. Preferably this transverse bar 24 is removably supported on the lugs 25.

The upper and lower marginal portions of the endless tubular filter element 20 are severally sealingly connected to the respective flanges of the upper and lower end rings. For this purpose, a garter type band 26 embraces the portion of the filter element which overlaps the corresponding flange and constricts the filter element into a secured and sealing engagement therewith. Inasmuch as the upper and lower end rings 21 and 23 respectively, are stationary, and the filter element 20 is secured to these end rings, the filter element itself is stationary.

Arranged within the filter element 20 and between the end rings 21 and 23 supporting the same is a movable cage or reel indicated generally at 28. This reel 28 is shown as having a centrally disposed tubular support or torque tube 29, arranged with its axis extending vertically and concentric with the end rings 21 and 23, an upper spider 30 arranged slightly below the upper end ring 21 and fast to the torque tube 29, a lower spider 31 arranged adjacent the lower end ring 23 and fast to the torque tube 29, and a plurality of rollers 32 operatively interposed between these spiders 30 and 31. The rollers 32 are arranged with their axes extending vertically and are parallel to each other and also to the central torque tube 29 and are further spaced at the same radial distance.

As best shown in FIG. 4, at the location of each roller 32, the upper and lower spiders 30 and 31, respectively, are provided with vertically alined, radially outwardly extending arms, that for the upper spider 30 being indicated at 33 and that for the lower spider 31 being indicated at 34. The upper arm 33 carries a downwardly extending pivot pin 35 and the lower arm 34 carries an upstanding pivot pin 36 which is in alinement with the upper pin 35. The opposing ends of these pins 35 and 36 are shown as supporting upper and lower antifriction bearings 38 and 39, respectively. Surrounding the outer races of these bearings 38 and 39 is a length of cylindrical tubing or pipe which constitutes the roller 32. It will be seen that with such an arrangement the rollers 32 are freely revolvable.

Referring to FIG. 2 which shows the rollers 32 arranged at circumferentially spaced intervals, it will be seen that the reaches or stretches of the flexible filter element 20 between adjacent pairs of rollers bulge or arch radially inwardly because the pressure differential is such that the higher pressure is on the outside or exterior of the filter element and the lower pressure on the inside or interior thereof, as more fully explained hereinafter.

Particle laden gas in contact with the exterior of the filter element 20 has the particles filtered therefrom by passage of the gas component through the filter element, the filtered out particles being deposited upon the external surface of the filter element. It is an important feature of the invention to effectively and continuously clean the filter element 20 of such deposited particles. For such purpose, a blow tube 40 is arranged between a pair of adjacent rollers, such rollers being indicated in FIG. 2 at 321. The blow tube 40 extends vertically substantially the full distance between the end rings 21 and 23 supporting the filter element 20. The opposite ends of the blow tube 40 are shown as contracted and closed and supported on an arm 41 extending radially outwardly from the upper and lower spiders 30 and 31, respectively. The detail of such a mounting is illustrated for the lower end of the blow tube in FIG. 5. The end of the blow tube 40 is secured to the arm 41 by a stud 42 extending axially from the end of the blow tube and through a hole provided in the arm 41 and has its outer end portion threaded to receive a nut 43. With such a fastening at opposite ends of the blow tube, the same can be secured against radial movement with respect to the axis of the reel and against rotative movement about its own axis. The outer salient portion of the blow tube 40 is shown as provided with a longitudinally extending slot or aperture 44. This aperture or slot 44 extends substantially the full length of the blow tube 40. It is through this slot that pressurized gas such as compressed air is discharged to pass through the filter element 20 as it slides over the blow tube past this slot or aperture. Instead of a single slot 44, the blow tube 40 may be provided with a series of overlapping individual slots (not shown) which will maintain the structural strength of the blow tube and yet provide full length cleaning.

Referring to FIG. 2 it will be seen that the reaches or stretches of the filter element 20 between the rollers 321 and the intermediate blow tube 40 provide inward bulges or arches. The purpose of the rollers 321 on opposite sides of the blow tube 40 is to control the circumferential extent to which the filter element wraps around the blow tube. In other words, the rollers 321 are guides to control the area of peripheral contact between the filter element and the external surface of the blow tube 40 along opposite sides of the discharge opening 44 in the blow tube. Preferably the filter element does not contact the blow tube along an arc of more than about 90°.

At intervals along its length, the blow tube is shown as connecting with the hollow support or torque tube 29. For this purpose, the blow tube 40 is shown as provided with a pair of axially spaced nipples 45. The torque tube 29 carries a pair of axially spaced nipples 46 which severally oppose the nipples 45. These corresponding pairs of nipples 45 and 46 are connected by a sleeve 48.

Referring to FIG. 1, the torque tube 29 is shown as extending upwardly through an opening provided in the top wall 18 for the casing 15, and through an opening provided in another horizontal wall 49 arranged in spaced relation above the top wall 18. A side wall 50 extends between the horizontal walls 18 and 49 to provide an enclosure or chamber 47 having an outlet 51 for cleaned gas which is provided by the gas component of the particle laden gas introduced in the casing 15. The gas passes through the filter element 20 to the interior thereof, being cleaned thereby, passing thence upwardly through the spaces between the radial arms of the upper spider 30 and through an annular series of openings 52 provided in the top wall 18 for the casing. Each of the openings 52 is shown in FIG. 2 as being of sector shape. Arranged over the webs of the top wall 18 between adjacent openings 52 are radially disposed angle members 53 which reinforce the top wall 18 for the casing 15 and also rigidly position the lower end of a tubular sleeve 54 which extends between the top wall 18 for the casing and the upper horizontal wall 49. The lower end of the sleeve 54 is secured to the horizontal wall 18 by a ring 55. The upper end of the sleeve 54 is secured to the horizontal wall 49 by a similar ring 56. The rings 55 and 56 are fastened to the horizontal walls 18 and 49, respectively, in any suitable manner as by screws 57. Within the sleeve 54 adjacent its lower end is a bushing 58 which journals the torque tube 29. The upper end of the sleeve 54 is closed by a bushing 59 which has an annular outwardly extending flange portion 60 which provides a thrust collar engaging the upper end face of the sleeve 54. This upper bushing 59 also journals the torque tube 29 which continues to extend upwardly past this bushing, as best shown in FIG. 3. Immediately above the upper bushing 59 is an anti-friction bearing 61 which surrounds the torque tube 29. Above this bearing 61 is a collar 62 secured non-rotatively to the torque tube 29. For this purpose one or more screws 63 are shown as passing through registered openings in the collar 62 and torque tube 29. Immediately above the collar 62 is the hub 64 of a driven gear wheel 65. This wheel is fast to the upper extremity of the torque tube 29. For this purpose the hub 64 of the gear wheel may be keyed to the torque tube, as indicated by the key 66. The upper end of the torque tube 29 is shown as closed by a plug 68.

The gear wheel 65 forms an element of the means for rotating the torque tube 29 and through it the reel 28. As shown in FIG. 1, the gear wheel 65 is driven by a pinion 69 meshing therewith and fast to a vertically extending shaft 70 journalled suitably on the horizontal wall 49 and also on the top of a box-like cover 71. The shaft 70 extends upwardly through the top wall of the cover 71 and its upper extremity is shown as having fast thereto a worm wheel 72 which meshes with a worm 73 fast to the armature shaft of an electric drive motor 74. This motor 74 is shown as being supported on the top wall of the box-like cover 71.

The sleeve 54 is stationary and surrounds in spaced relation that portion of the torque tube 29 which extends through the outlet chamber 47 for clean gas. The portion of the torque tube 29 intermediate the ends of the surrounding sleeve 54 is shown as provided with a plurality of holes 75 which establish communication between the interior of the torque tube 29 and the annular space between this tube and the surrounding sleeve 54.

Means are provided for supplying pressurized gas such as compressed air to the aforesaid annular space between the torque tube 29 and surrounding sleeve 54. As shown, the sleeve 54 is provided with a laterally extending nipple 76 which receives one end of a duct 78 connected at its opposite end to the outlet of a fan or blower 79. This fan or blower 79 may be driven in any suitable manner and is operative to take in atmospheric air, compress it and supply it to the interior of the torque tube 29, from whence it flows into the hollow branch arms constituted by the nipples 45 and 46 and intermediate sleeve 48, to the interior of the blow tube 40.

The lower end of the torque tube 29 is shown as closed by a plug 80 having a central opening to receive the upstanding pintle 81 suitably supported on the transverse member 24.

Operation of FIGS. 1 Through 5

Assume particle laden gas such as dirty air is introduced into the tangential inlet 16 for the casing 15. Inasmuch as an annular space exists between the outside of the filter element 20 and the surrounding casing wall 15, the larger particles contained within the introduced gas will be acted upon by centrifugal force and will whirl their way downwardly into the hopper 19. This provides what may be termed an initial knock-out of the heavier particles. The lighter particles remain suspended in the gaseous medium but are filtered out and deposited upon the external surface of the filter element 20 as the gaseous component passes through this filter element.

Assume now that the means driving the blower 79 are operative. This blower supplies pressurized gas such as compressed air through the duct 78 into the annular space between the torque tube 29 and surrounding sleeve 54. Since this annular space is closed at opposite ends of the bushings 58 and 59, the pressurized gas is constrained to pass through the openings 75 into the interior of the torque tube 29. Since this tube is closed at opposite ends the pressurized gas flows into the branch passages and thence into the blow tube 40. The blow tube 40 will discharged through its outlet 44 a jet of pressurized gas which blows off deposited particles on the exterior of the filter element 20. The deposits so blown off drop by gravity or are carried by the downwardly swirling vortex into the hopper 19.

There is relative rotative movement between the reel 28 and the filter element 20. This is due to rotation of the reel 28 while the filter element 20 remains stationary. With the electric motor 74 energized, the worm 73 drives the worm wheel 72, rotating the shaft 70 and drive pinion 69. This rotates the gear wheel 65 which is fast to the upper end of the torque tube 29 and thus this tube is rotated. Inasmuch as the various rollers 32, and even the blow tube 40, are supported on the torque tube 29, the rollers and blow tube will rotate around inside the filter element 20. The rollers 32 due to their frictional engagement with the filter element will rotate about their respective axes. The blow tube 40 is non-rotatable upon its own axis and therefore the filter element is dragged or pulled across and wipingly engages the salient portion of the blow tube. This sort of engagement with the blow tube is desired, however, since it provides an intimate contact between successive portions of the filter element as they pass over the blow tube. The extent of frictional engagement between the filter element 20 and the blow tube 40 is kept to a minimum by control of the rollers 321 on opposite sides of the blow tube. The rollers 321 are dimensioned and disposed with respect to the blow tube 40 such that effective sealing of the filter element to the surface of the blow tube along opposite sides of the longitudinally extending discharge opening 44 therein, is provided without producing an excessive drag on the filter element. Any excessive drag in this filter element would tend to stretch it and place an unnecessary strain thereon. However, in this connection, it will be noted that any dimensional changes in the filter element in a circumferential direction due to stretch, strain, varying humidity conditions, temperature, or from whatever cause, are accommodated by the bulges or arches formed between adjacent rollers of the reel. For example, if the filter element stretches comparatively a greater amount, the bulges or arches will be deeper. On the other hand if the total effective stretch is relatively small, the bulges or arches will be shallower.

FIGS. 6 THROUGH 9

The chief distinction of the modified form of the invention shown in FIGS. 6 through 9, as compared to that shown in FIGS. 1 through 5, is that the reel is stationary and the filter element rotates about the reel. In both forms, there is relative movement between the reel and filter cloth.

Turning now to structure, the modified form of the invention shown in FIGS. 6 through 9 comprises a cylindrical casing 85 having a tangential inlet 86, a top wall 88, and a hopper 89 at its lower end. A filter element 90 has its upper end embracing the depending flange 91 of an upper rotatable end ring 92. The lower marginal portion of the filter element 90 embraces the upstanding annular flange 93 of a lower rotatable end ring 94 the end head portion of which is imperforate except for a central opening which receives the lower end of a vertical drive shaft 95. The lower end ring 94 is fast to the shaft 95 and for this purpose the end head portion of the end ring 94 carries a collar 96 surrounding the shaft 95 and secured thereto as by the set screw 98. The upper end ring 92 has an upstanding annular neck 99 having a diameter less than that of the annular depending flange 91.

It will be seen that if the upper end ring 92 and the lower end ring 94 are rotated at the same velocity, the filter element 90 secured to these end rings as by garter bands 97 will be caused to rotate with these rings.

The lower end ring 94 is rotated by rotating the shaft 95. The means for doing this include a gear wheel 100 fast to the upper end of the shaft 95. Meshing with this gear wheel 100 is a drive pinion 101 fast to an intermediate portion of a vertical shaft 102 arranged to one side of the central shaft 95 and parallel thereto. The drive shaft 102 is journalled immediately below the drive pinion 101 in a bearing mounted on a horizontal wall 103 spaced above the top wall 88 for the casing 85. The shaft 102 is suitably journalled at its lower end, in a manner to be explained, and adjacent this lower end carries a second drive pinion 104. This pinion 104 meshes with a ring gear 105 surrounding and fast to the tubular neck 99 on the upper end ring 92. The ring gear 105 and gear wheel 100 are of the same diameter, and the drive pinions 101 and 104 are also of the same diameter. By rotating the shaft 102, it will be seen that the upper and lower end rings 92 and 94, respectively, will be rotated at the same annular velocity.

The means for rotating the drive shaft 102 are shown as comprising a worm wheel 106 fast to the upper end of the shaft 102 and driven by a worm 108 fast to the armature shaft of an electric drive motor 109. This motor 109 is shown as supported on the top wall of a box-like enclosure or cover 110 which covers the pinion 101 and gear wheel 100.

Figure 7:
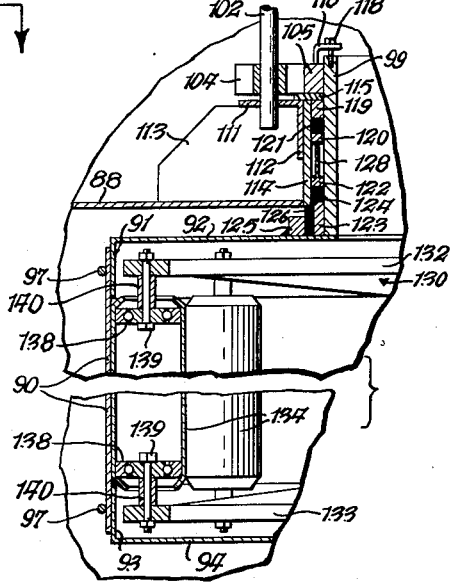
FIG. 7 is an enlarged fragmentary sectional view through a part of the drive mechanism for rotating the end rings supporting the filter element and also illustrating the end mounting of a typical idler roller constituting an element of the reel illustrated in FIG. 6.
Figure 8:
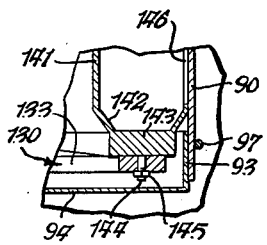
FIG. 8 is an enlarged fragmentary vertical central sectional view of the lower end of the blow tube shown in FIG. 6.

The means for journalling and sealing the rotative mounting of the neck 99 of the upper end ring 92 on the top wall 88 for the casing 85, are best shown in FIG. 7. As there shown, an annular horizontal plate 111 having a depending annular flange 112 is supported in spaced relation above the top wall 88 by a series of circumferentially spaced ribs or vertical plates 113. Arranged between the upper horizontal annular plate 111 and the top wall 88 is a cylindrical sleeve 114 which serves as a liner for the flange 112. Interposed between the upper edge of the sleeve 114 and the upper surface of the horizontal annular plate 111, on the one hand, and the ring gear 105 on the other hand, is an annular flat sided thrust washer 115. The ring gear 105 is splined or keyed to the neck 99 which allows a slight relative axial movement therebetween. The upper end ring 92 hangs by its neck 99 on the so supported ring gear 105 as by the L-shaped clamping members 116 bearing at one end against the upper surface of the ring gear 105 and fastened to the tubular neck 99 by the take-up screws 118.

A pair of vertically spaced retainer rings 119 and 120, with an intermediate packing 121, are arranged adjacent the upper end of the space between the sleeve 114 and neck 99. A similar pair of retainer rings 122 and 123, with an intermediate packing ring 124, are arranged adjacent the base of the upstanding neck 99 and between this neck and the sleeve 114. A retainer ring 125 is shown as surrounding the lower retainer ring 123 in radially spaced relation therewith and in the space therebetween is disposed a packing ring 126. The outer retainer ring 125 is secured to the upper end ring 92 in any suitable manner as by being welded thereto. The opposing retainer rings 122 and 120 are maintained separated by an intermediate spreader ring 128.

In this manner the neck 99 of the upper end ring 92 is journalled on the bearing sleeve 114 and a seal is provided between these relatively movable surfaces. It will be seen that by tightening the take-up screws 118, the various packings 121, 124 and 126 can be further compressed.

Arranged within the filter sleeve 90 is a stationary reel 130. This reel is shown as comprising a central, vertical, stationary, tubular support or pipe 131, an upper spider 132 arranged immediately below the upper end ring 92, a lower spider 133 arranged immediately above the lower end ring 94, and a plurality of circumferentially spaced rollers 134 arranged intermediate the spiders 132 and 133. The spiders 132 and 133 are made fast to the tube 131 in any suitable manner as by having hubs surrounding the tube and set screws carried by these hubs bearing against the tube. The tube 131 is shown as surrounding the shaft 95 in spaced relation thereto, and extends upwardly through the neck 99 and is supported at its upper end from the upper horizontal wall 103. As shown, the tube is welded thereto. No support for the lower end of the tube 131 is shown, although one may be provided, if desired. The tube 131 at its lower end is shown as carrying internally a bearing 135 on which the lower end of the shaft 95 is journalled. The upper end of this shaft is journalled on a thrust bearing 136 arranged on the upper surface of the horizontal wall 103.

In FIG. 6, each of the rollers 134 are shown as being freely rotatably mounted on the spiders 132 and 133. For this purpose the roller 134 is in the form of an elongated tube or pipe into each end of which is press-fitted or otherwise suitably mounted, an anti-friction bearing 138 as shown in FIG. 7. The outer race of each such bearing is fast to the tubular roller 134 and the inner race is fast to the shank of a pivot pin 139 which is shown as being in the form of a bolt the nut of which bears against the outer side of the corresponding spider and carries a head on its inner end which bears against the inner end of the inner race, a spacer or washer 140 being interposed between the spider and the inner bearing race. Preferably the extremity of the tubular roller 134 is turned in annularly to act as a stop to prevent unintentional removal of the bearing 138.

Figure 9:
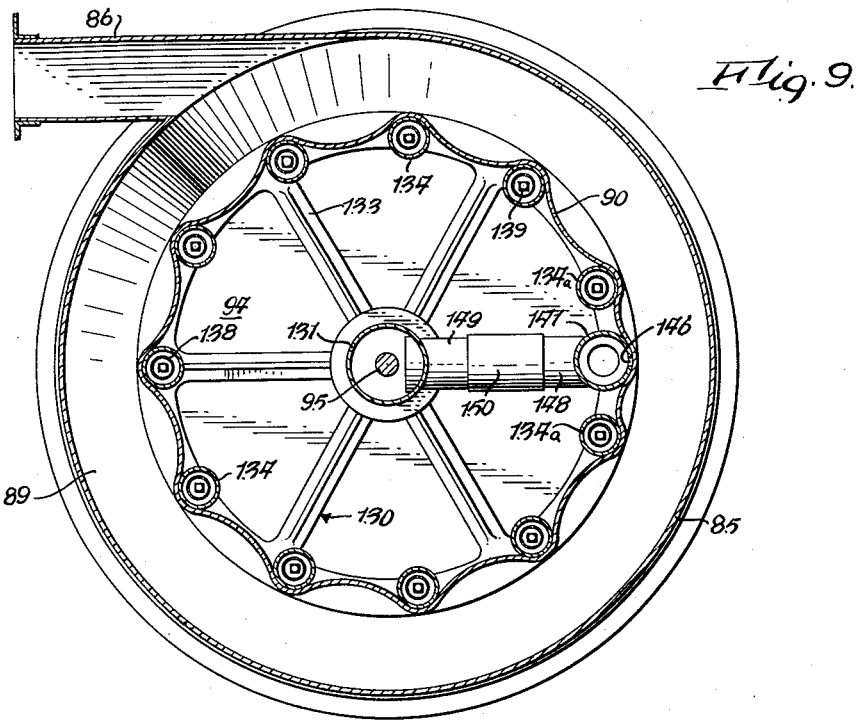
FIG. 9 is an enlarged transverse sectional view of the dust collector shown in FIG. 6 and taken on line 9—9 thereof.

As with the form of the invention previously explained, intermediate an adjacent pair of rollers 134, specifically designated 134a in FIG. 9, is disposed a blow tube 141. This blow tube 141 is a vertically elongated pipe or tube closed at opposite ends and mounted non-rotatably on the spiders 132 and 133. The detail of mounting the blow tube on the spiders is shown typically for the lower end in FIG. 8. There the end of the blow tube 141 has a conical section 142 and a closed end head 143 from which a centrally arranged and axially extending stud 144 projects. This stud 144 extends through a hole provided in the corresponding spider, such as the lower spider 133 shown, and the end face of the end wall 143 bears against the opposing surface of the spider. A nut 145 is threaded upon the outer extremity of the stud 144 and bears against the outer end face of the corresponding spider such as the spider 133 shown.

The blow tube 141 is provided with a vertically elongated discharge opening or aperture 146 which extends substantially the full length of the effective height of the filter element 90. With the radially outer salient portion of the blow tube 141 arranged substantially in an imaginary cylinder touching the salients of the rollers 134 and with the aperture or discharge opening 146 being at the crest of such salient, it will be seen, especially by reference to FIG. 9, that as the filter element 90 is drawn over the stationary blow tube 141 the blow tube can discharge pressurized gas through its aperture 146 to pass through the foraminous filter element.

The means for supplying pressurized gas such as compressed air to the blow tube 141 are similar to those described in connection with the description of the form of the invention shown in FIGS. 1 through 5. Thus the blow tube 141 has a pair of vertically spaced radially inwardly projecting nipples 148 in alinement severally with a pair of radially outwardly projecting nipples 149 mounted on the tubular support 131. The opposing ends of the corresponding pairs of nipples 148 and 149 are suitably connected as by a coupling sleeve 150. Between the spaced horizontal walls 88 and 103, the interior of the tubular support 131 is shown as communicating via the duct 151 with the outlet of a blower or fan 152. The duct 151 is shown as extending upwardly through the wall 103 and top wall of the cover 110. The blower or fan 152 is suitably driven.

The space between the horizontal walls 88 and 103 is enclosed by a vertical wall 153 to provide an outlet chamber 154 for cleaned gas. This chamber has an outlet 155.

Figure 10:
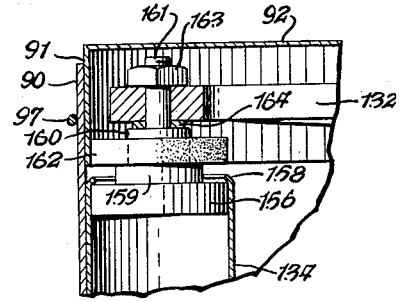
FIG. 10 is a fragmentary longitudinal sectional view through one end of a reel roller and showing the roller arranged to be driven.

Instead of the rollers 134 being freely rotatable and in effect caused to rotate about their axes by frictional engagement with the filter sleeve 90, all or some of the rollers can be driven. An arrangement for such a driven roller is typically illustrated in FIG. 10. The upper end of the roller 134 is shown as having press-fitted thereinto a plug 156, preferably held against withdrawal by the inturned annular end of the tubular roller, as indicated at 158. The plug 156 has a series of three concentric stepped necks 159, 160 and 161. Press-fitted upon the intermediate neck 160 is a rubber faced wheel 162 the periphery which is adapted to engage the inner cylindrical surface of the depending flange 91 of the upper end ring 92. The upper neck 161 is in the nature of a threaded stud which extends through a hole provided in the upper spider 132 and a nut 163 arranged on the outer end of the neck 161 bears against the upper surface of the upper sprocket 132. Preferably a washer 164 is interposed between the upwardly facing shoulder formed by the juncture between the necks 160 and 161 and the lower surface of the spider 132. It will be seen that as the upper end ring 92 rotates, while the spider 132 remains stationary, the frictional engagement between the rubber wheel 162 and the flange 91 of the end ring will cause the roller 134 to rotate. Thus the filter element 90 is relieved of stress and strain therein, slight though it may be, from driving the rollers 134.

*Operation of FIGS. 6 Through 10*

With the motor 109 being energized, the upper end ring 92 and lower end ring 94 are rotated at the same speed through the drive mechanism shown and described. Thus the worm 108 drives the worm wheel 106 in turn rotating the shaft 102. The pinion gears 101 and 104 fast to the shaft 102 drive the gears 100 and 105, respectively. Since these gears 100 and 105 are fast to the lower and upper end rings 94 and 92, respectively, and these gears are of the same size, as are the drive pinions 101 and 104, these end rings rotate at the same speed. Connected to the coincident opposing flanges 91 and 93 of these end rings is the filter element 90. This filter element is secured to the flanges 91 and 93 by the bands 97.

In this manner the filter element 90 is caused to rotate about the central vertical axis of the shaft 95. The reel 130 is stationary and concentrically arranged with respect to the rotating tubular, generally cylindrical filter element 90. The filter element engages the various rollers 134, 134a and the blow tube 141, providing inward bulges or arches between adjacent pairs of these members, as illustrated in FIG. 9. This is due to the fact that there exists a pressure differential on opposite sides of the filter element, with the higher pressure being on the outside thereof. This pressure differential is produced in any suitable manner, well known to those skilled in the art, such as by introducing particle laden gas into the inlet 86 under pressure, or by connecting a suction fan (not shown) to the outlet 155 of the outlet chamber 154 for cleaned gas. The particle laden gas introduced through the inlet 86 is subjected to centrifugal action which operates to knock-out the larger particles which are collected within the hopper 89 as previously explained. The gas laden with the finer particles attempts to pass through the filter element 90 which causes the particles to be filtered out and deposited upon the outside or higher pressure side of the filter element 90. The clean air passes through the filter element, thence upwardly between the spokes of the upper spider 132, through the tubular neck 99 and into the outlet chamber 154.

If the blower or fan 152 is driven, pressurized gas, such as compressed air, is supplied to the interior of the hollow tubular support 131 from whence it can pass from the branch ducts into the blow tube 141. From this blow tube the pressurized gas is discharged through the aperture 146 and through the filter element 90 blowing off the particles deposited on the outside thereof. Since there is relative rotation between the filter element and the blow tube 141, all portions of the filter element are cleaned progressively as this element presents successive vertical portions to the blow tube.

FIGS. 11–13

Figure 11:
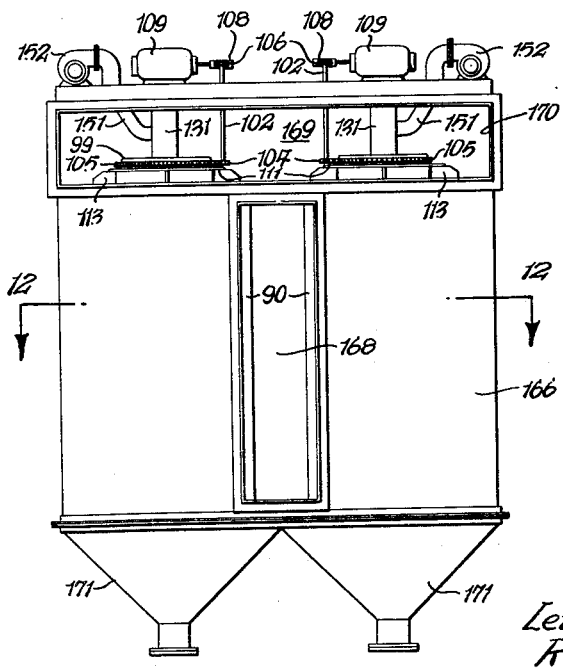
FIG. 11 is an end view of a dust collector embodying a plurality of filter elements and supporting structure therefor of the type shown in FIG. 6 arranged in a single casing, this view showing the inlet end of the collector.
Figure 12:
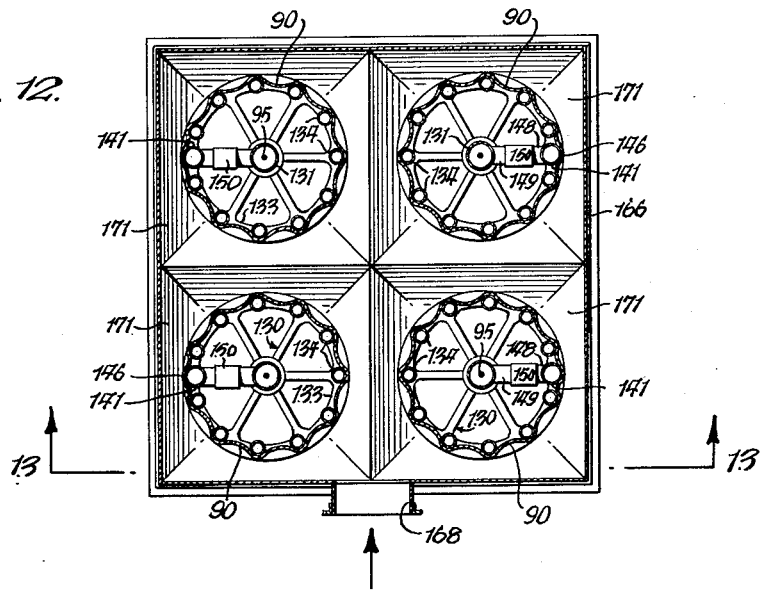
FIG. 12 is a transverse sectional view thereof taken on line 12—12 of FIG. 11, four filter elements and associated structures being illustrated.
Figure 13:
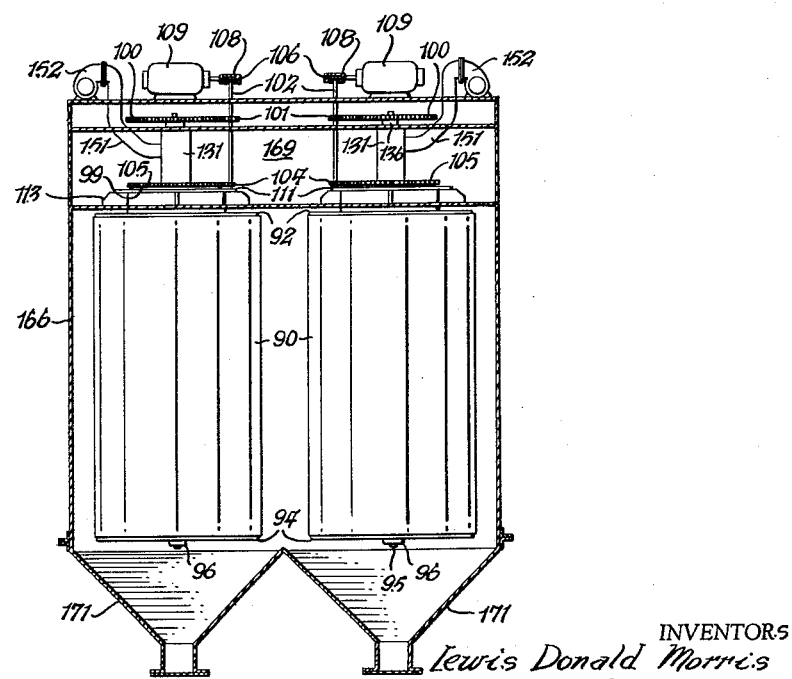
FIG. 13 is a vertical sectional view thereof taken on line 13—13 of FIG. 12.

The dust collectors described in connection with the preferred form of the invention illustrated in FIGS. 1 through 5 and the modified form illustrated in FIGS. 6 through 10, included only a single filter element. Shown in FIGS. 11 through 13 is a dust collector including a plurality of filter elements, four being specifically shown. Each of the filter elements and the associated drive mechanism therefor and the means for providing and supplying pressurized gas for cleaning the filter element, shown in FIGS. 11 through 13, is as illustrated in detail in FIGS. 6 through 10. Hence similar reference numerals have been used to indicate like parts. A detailed description of the individual filter elements and associated mechanisms will not be redescribed.

Referring to FIG. 12, in particular, the four filter elements 90 are arranged in spaced relationship in a square casing 166 with the blow tube 141 for each filter being arranged adjacent the wall of the casing. One wall of the casing 166 is provided with an inlet 168 which is in line with the space between the inner opposing portions of the two pairs of filter elements 90. Arranged above the casing 166 housing the filter elements 90 is an outlet chamber 169 for cleaned gas having an outlet 170 which is shown in FIG. 11 as being in the same side of the casing having the inlet 168. Arranged below each filter element 90 is a hopper 171 which encloses the lower end of the casing 166 and is suitably connected thereto.

*Operation of FIGS. 11–13*

Particle laden gas is introduced into the casing 166 through the inlet 168. A portion of the introduced particle laden gas is handled by each of the four filter elements 90. With the blow tubes 141 arranged adjacent the outer wall of the casing 166, the deposited particles blown off by the gas discharged by the blow tube and passing through the filter element is less likely to be reentrained into the gas moving around the filter elements 90. The blown off particles collect within the hopper 171 from whence the solids can be removed in any of many ways well known to those skilled in the art.

While only four filter elements have been shown in FIGS. 11–13, it will be appreciated that any number of such elements may be combined and arranged within a single housing, as desired.

The various casings shown for all forms of the invention illustrated may have access doors to permit access to the filter elements for inspection of the same and replacement if needed.

From the foregoing, it will be seen that the present invention accomplishes the various objects stated. The various embodiments shown and described are illustrative only and not limitative of the invention which is to be measured by the scope of the appended claims.

What is claimed is:

1. In a dust collector, the combination comprising a reel including an annular arrangement of spaced and parallel rollers, a flexible endless filter element embracingly surrounding said reel and supported thereby, a blow tube arranged intermediate an adjacent pair of said rollers and having an arcuate salient peripheral portion constantly contacting said filter element, the salient of said peripheral portion lying substantially in an imaginary cylinder touching the salients of said rollers, and means for effecting relative movement between said blow tube and filter element while the latter rolls on said rollers to wipingly contact said peripheral portion.

2. In a dust collector, the combination comprising a reel including an annular arrangement of circumferentially spaced and parallel rollers, a flexible endless filter element embracingly surrounding said reel and supported thereby, the reaches of said filter element between adjacent rollers forming arches, a blow tube arranged intermediate an adjacent pair of said rollers and having an arcuate salient peripheral portion constantly contacting said filter element, the salient of said peripheral portion lying substantially in an imaginary cylinder touching the salients of said rollers, the reaches of said filter element between said adjacent pair of rollers and said blow tube severally forming arches, said adjacent pair of rollers controlling the extent to which said filter element wraps around said peripheral portion, and means for effecting relative motion between said blow tube and filter element while the latter rolls on said rollers to wipingly contact said peripheral portion.

3. In a dust collector, the combination comprising a hollow support member, a reel supported on said member and including an annular arrangement of spaced rollers, an endless filter element surrounding said reel and supported thereby, a blow tube arranged between an adjacent pair of said rollers and constantly contacting said filter element, means establishing communication between the interiors of said blow tube and member, means for supplying pressurized gas to said member, and means for effecting relative movement between said blow tube and filter element while the latter rolls on said rollers.

4. In a dust collector, the combination comprising a hollow support member, a reel supported on said member and including an annular arrangement of spaced rollers, end rings at opposite ends of said reel, an endless filter element surrounding said reel and end rings and supported thereby, means sealingly connecting said filter element to said end rings, a blow tube arranged between an adjacent pair of said rollers and constantly contacting said filter element, means establishing communication between the interiors of said blow tube and member, and means for effecting relative movement between said end rings and member whereby said filter element slides over said blow tube while rolling on said rollers.

5. In a dust collector, the combination comprising a reel including an annular arrangement of spaced and vertically disposed rollers, an endless filter element surrounding said reel and supported thereby, a vertically disposed blow tube arranged between an adjacent pair of said rollers and constantly contacting said filter element, a casing housing said reel and into which casing particle laden gas is adapted to be introduced, an outlet chamber for cleaned gas arranged above said casing and communicating with the interior of said filter element, and drive means arranged above said casing for effecting relative movement between said reel and filter element.

6. In a dust collector, the combination comprising a casing, an outlet chamber for cleaned gas at one end of said casing, a torque tube extending through said outlet chamber and into said casing, a reel arranged on said torque tube within said casing and including an annular arrangement of spaced rollers, stationary end rings within said casing at opposite ends of said reel, a blow tube arranged between an adjacent pair of said rollers and supported by and communicating interiorly with said torque tube, an endless filter element embracingly surrounding said reel, blow tube and end rings and communicating interiorly with said chamber, means sealingly connecting said filter element to said end rings, means for supplying pressurized gas to the interior of said blow tube, and drive means arranged on the side of said chamber opposite from said casing and arranged to rotate said torque tube.

7. In a dust collector, the combination comprising a casing, an outlet chamber for cleaned gas at one end of said casing, a stationary tubular support extending through said outlet chamber and into said casing, a reel arranged on said tubular support within said casing and including an annular arrangement of spaced rollers, rotatable end rings within said casing at opposite ends of said reel, a blow tube arranged between an adjacent pair of said rollers and supported by and communicating interiorly with said tubular support, an endless filter element embracingly surrounding said reel, blow tube and end rings and communicating interiorly with said chamber, means sealingly connecting said filter element to said end rings, means for supplying pressurized gas to the interior of said blow tube, and drive means for rotating said end rings.

8. In a dust collector, the combination comprising a cylindrical casing including a top wall having an opening therein, a hopper at its lower end and a tangential inlet in its side, an outlet chamber above said top wall, a reel arranged in said casing between said hopper and top wall and including an annular arrangement of spaced rollers, a blow tube arranged between an adjacent pair of said rollers, an end ring above the upper end of said reel and surrounding said opening, another end ring below the lower end of said reel and having a closed end, an endless filter element embracingly surrounding said reel, blow tube and end rings, means sealingly connecting said filter element to said end rings, said outlet chamber communicating through said opening with the interior of said filter element, and drive means for effecting relative movement between said reel and filter element.

References Cited in the file of this patent

UNITED STATES PATENTS

| Re. 24,521 | Young | Aug. 19, 1958 |
| 333,463 | Holt | Dec. 29, 1885 |
| 1,002,618 | Winkler | Sept. 5, 1911 |
| 2,134,544 | Ashley | Oct. 25, 1938 |

FOREIGN PATENTS

| 6,870 | France | Jan. 25, 1907 |
| | (1st addition to No. 366,807) | |